United States Patent [19]

Zaiser et al.

[11] 4,319,466
[45] Mar. 16, 1982

[54] SECUREMENT OF LEAF SPRINGS IN TORSIONALLY ELASTIC COUPLING

[75] Inventors: Wolfgang Zaiser, Steinheim; Ernst Elsner, Herbrechtingen, both of Fed. Rep. of Germany

[73] Assignee: Voith Getriebe KG, Fed. Rep. of Germany

[21] Appl. No.: 69,372

[22] Filed: Aug. 24, 1979

[30] Foreign Application Priority Data

Aug. 26, 1978 [DE] Fed. Rep. of Germany ....... 2837395

[51] Int. Cl.³ .............................................. F16D 3/14
[52] U.S. Cl. .................................................. 64/27 L
[58] Field of Search .......................... 64/27 L, 15 R

[56] References Cited

U.S. PATENT DOCUMENTS

| | | | |
|---|---|---|---|
| 1,595,763 | 8/1926 | Eaton | 64/27 L |
| 1,990,683 | 2/1935 | Wood | 64/27 L |
| 2,029,516 | 2/1936 | Tower | 64/27 L |
| 2,227,333 | 12/1940 | Campbell | 64/15 R |
| 2,266,872 | 12/1941 | Kuhns et al. | 64/27 L |
| 2,379,175 | 6/1945 | Mulheim | 64/27 L |
| 3,084,524 | 4/1963 | McLay | 64/14 |

FOREIGN PATENT DOCUMENTS

| | | | |
|---|---|---|---|
| 555438 | 7/1932 | Fed. Rep. of Germany | 64/27 L |
| 1206219 | 12/1965 | Fed. Rep. of Germany | 64/27 L |
| 802227 | 8/1936 | France | 64/27 L |

*Primary Examiner*—Ira S. Lazarus
*Assistant Examiner*—Magdalen Moy
*Attorney, Agent, or Firm*—Ostrolenk, Faber, Gerb & Soffen

[57] ABSTRACT

The disclosure concerns a torsionally elastic coupling comprised of a central hub and an outer ring around the hub and spaced therefrom wherein the ring may relatively shift with respect to the hub. A series of leaf-spring assemblies are arrayed around the hub and the leaf-springs thereof project from the inner hub to the outer ring. A respective groove in the outer ring receives at least the longer ones of the leaf-springs of each assembly. Reinforcements are positioned in these grooves for being engaged by the leaf-springs. The leaf-springs of each assembly are of varying length. For holding the leaf-spring assemblies to the hub, there are wedge-shaped intermediate pieces between adjacent leaf-spring assemblies. Alternate wedge-shaped intermediate pieces are fastened to the hub and the other alternate ones are integrally formed with the hub.

18 Claims, 3 Drawing Figures

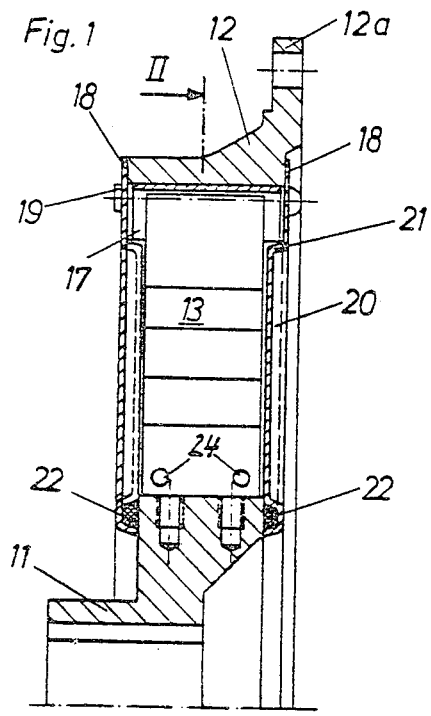
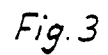
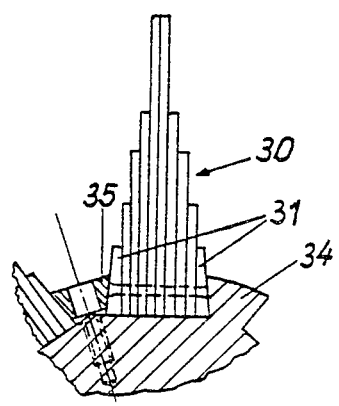
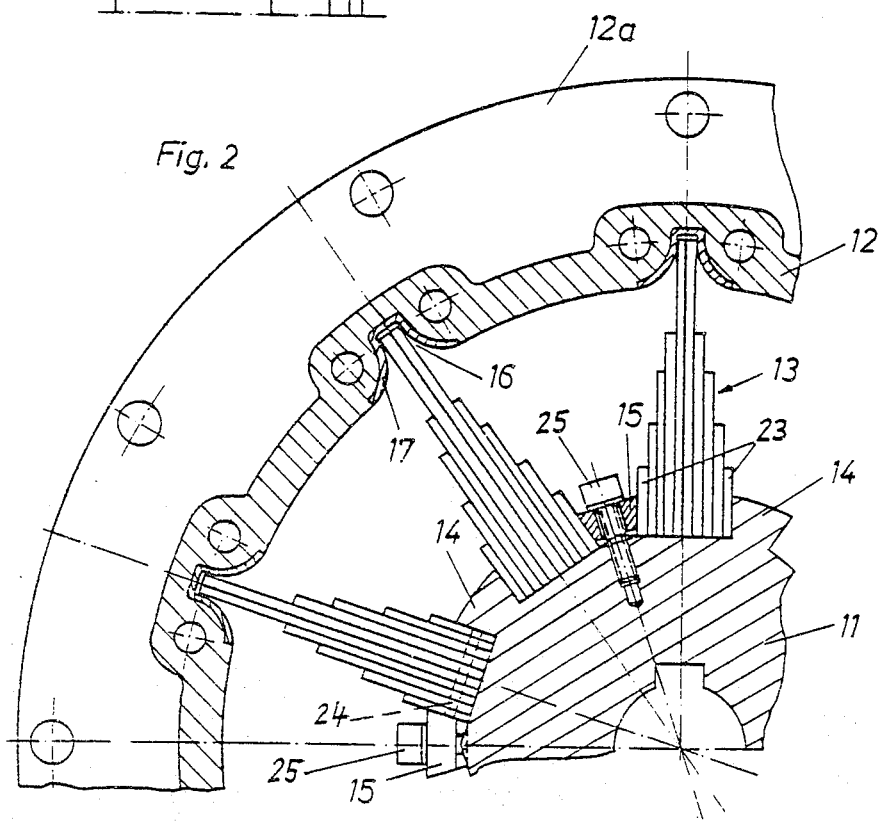

SECUREMENT OF LEAF SPRINGS IN TORSIONALLY ELASTIC COUPLING

BACKGROUND OF THE INVENTION

The present invention relates to a torsionally elastic coupling or, more particularly, a leaf spring coupling.

The torsionally elastic coupling has a first or inner coupling or hub, and a second or outer coupling part or outer ring. The two coupling parts are connected elastically to each other by radially arranged leaf-spring assemblies. The leaf-spring assemblies comprise leaf springs of different length, which together define a body of homogeneous flexural stress. The leaf-spring assemblies are rigidly connected to the hub by means of wedge-shaped intermediate pieces that form part of the hub and that are arranged between neighboring leaf spring assemblies. The longest leaf spring in the assemblies engage movably into the outer ring.

One torsionally elastic leaf-spring coupling is disclosed in German Pat. No. 555,438. The mode of attachment of the leaf-spring assemblies to the hub is significant there. Seen in longitudinal section, along the axis of rotation, each leaf-spring assembly has a T-shaped base. The base is fitted along one of its sides in an annular recess in the hub and along the other of its sides in an annular recess in a cover ring. In order to prevent undesired travel of the leaf-spring assembly in the circumferential direction, a wedge-shaped intermediate piece is clamped between every adjacent pair of leaf-spring assemblies. This prior art construction is expensive because of the T-shape of the bases of the leaf spring assemblies and because a cover ring is necessary in addition to the hub.

In making modern leaf-spring couplings, fabricators attempt to employ rectangularly shaped leaf springs, since they are simpler to manufacture. Such springs can preferably be cut from strip material. Known couplings of this type, as shown in German Pat. No. 1,202,590, are developed in the following way. An outer ring, two sides discs, and intermediate pieces between which the leaf-spring assemblies are clamped are all rigidly connected together. The resilient ends of the leaf springs extend radially inward, so that the longest leaf springs engage grooves in the hub. The clamping of the leaf-spring assemblies in the outer ring is effected by pressing a conically shaped intermediate ring into the outer ring. The outer ring thus must also be conical on its inner side. These known couplings have proven satisfactory in operation. However, their cost of manufacture is very high due to the complicated construction for the clamping of the leaf-spring assemblies in the outer ring.

SUMMARY OF THE INVENTION

An object of the present invention is to provide a leaf-spring coupling which can be manufactured at lower cost than known leaf-spring couplings.

Another object of the invention is to simply, yet effectively, clamp the leaf spring assemblies to one of the coupling parts, e.g. the hub.

In order to achieve these objects, one starts with the leaf-spring coupling disclosed in German Pat. No. 555,438. The invention comprises using wedge-shaped intermediate pieces, through fastening means such as radially extending screws, to be the sole fastening means for clamping the leaf-spring assemblies to the hub. The wedge-shaped pieces have tapering side walls that hold, e.g. by directly engaging, the undivided leaf-spring assemblies to the hub. At first sight, it appeared doubtful whether this inventive attachment of the leaf-spring assemblies to the hub would be sufficiently reliable. Experiments have confirmed, however, that it is possible to dispense with the T-shape of the leaf-spring assembly bases and with the correspondingly shaped recesses in the hub. In this way, the covered ring which is required in the coupling of German Pat. No. 555,438 can also be eliminated. In addition, there are the savings resulting from the use of leaf springs of simple rectangular shape.

The present invention increases the assurance against radial movement of the leaf-spring assemblies away from the hub by additional measures, described below. However, such measures are not required.

The following advantages are obtained with the invention, as compared with the leaf spring coupling disclosed in German Pat. No. 1,202,590. In particular, the conical intermediate ring of the prior patent is eliminated. Thus, the production of a conical inner surface on the outer ring may also be eliminated. Furthermore, the intermediate surfaces serving for the clamping of the leaf-spring assemblies are substantially smaller and lighter. If the coupling of the invention is provided with side discs and is filled with a lubricant, another advantage results. Lubrication of the points of engagement of the longest leaf springs in the outer ring is still assured, even if a part of the lubricant should be lost, since the lubricant always places itself against the outer ring in operation, as a result of the centrifugal force.

The leaf spring assemblies should be spaced around the hub as equidistantly as possible. This spacing is considerably facilitated by every second or alternate wedge-spaced intermediate piece being developed on the hub and by only the other intermediate pieces being fastened or screwed onto the hub. Although this makes manufacture of the hub somewhat more expensive, nevertheless the positions of the leaf-spring assemblies in the circumferential direction can be maintained very precisely.

The coupling of the invention applies considerable clamping forces at the clamping points of the leaf-spring assemblies. This keeps these forces away from the outer ring. Therefore, the outer ring can be made of light metal. As a result, the entire weight of the coupling can be substantially reduced. It is advisable to provide reinforcements of wear-resistant material at the points of engagement of the longest leaf springs in the outer ring. As is known, the points of engagement in the outer ring can be developed as grooves having rounded side surfaces. The reinforcements can therefore be produced from correspondingly rounded metal sheets or from round profiled bars.

The leaf-spring coupling of the invention can be used preferably in drives for vehicles to serve as an elastic coupling and can be used as a vibration absorber between an internal combustion engine and a power transmission.

Other objects and features of the invention will be apparent from the embodiments of the invention described below with reference to the drawings.

BRIEF DESCRIPTION OF THE DRAWINGS

FIG. 1 is a longitudinal sectional view through an embodiment of a leaf-spring coupling;

FIG. 2 is a sectional view along the line II of FIG. 1;

FIG. 3 is a partial sectional view through a second embodiment of a leaf-spring coupling.

DESCRIPTION OF PREFERRED EMBODIMENTS

The leaf-spring coupling shown in FIGS. 1 and 2 comprises a hub 11 (which serves as an inner coupling part) and an outer ring 12 (which serves as an outer coupling part). The outer ring 12 has an attachment flange 12a.

A plurality of leaf-spring assemblies 13 are clamped to the hub 11. The leaf-springs in the assemblies 13 extend in the radial direction. Each leaf-spring assembly 13 is comprised of a plurality of rectangular leaf springs of different respective lengths. Each assembly 13 is held together by a respective pin or rivet 24 passing through the springs of that assembly. As seen in the axial direction (FIG. 2), the leaf-spring assemblies have an approximately triangular shape. The springs in each assembly are thus longer toward the middle of the assembly. In this way, each assembly 13 approximates a body of homogeneous flexural stress. The longer, middle springs of each assembly extend into respective inwardly facing grooves 16 in the outer ring 12, which grooves are aligned with the longer springs in the respective assemblies.

Wedge-shaped intermediate pieces 14, 15 are provided for clamping the leaf-spring assemblies 13 to the hub 11. The pieces have side walls 14, 15 that taper narrower toward the axis of the coupling. The fixed intermediate pieces 14 are formed on the hub. The separate but similarly wedge-shaped intermediate pieces 15 are fastened to the hub by screws 25. As shown in FIG. 2, the screws are tightened radially, having the inherent result of moving the intermediate pieces inward radially. The intermediate pieces 14, 15 alternate in the circumferential direction around the hub 11. This is a simple, space-saving and dependable attachment of the leaf-spring assemblies 13 to the hub 11. The tapered side walls of each piece 14,15 engages the opposed sides of the leaf-spring assemblies between which that intermediate piece is positioned. The shapes of the engaging surfaces are complementary.

The outer ring 12 can be made of light weight metal. The grooves 16 on the inside of the ring extend parallel to the axis. Each groove has rounded side surfaces at its entrance for receiving the leaf springs. The side surfaces of the grooves are protected against wear by respective metal-sheet reinforcements 17. The metal sheet reinforcements 17 can be cast as part of ring 12 so they can be inserted into the suitably prepared grooves 16.

The opposite ends of the coupling transverse to the axis and to the tapered side walls of the intermediate pieces 14,15 are covered by respective side discs 18 which are identical in shape and size. They can be formed from relatively thin metal sheet, as shown in the drawing, or can be formed by die casting. They are fastened to the outer ring 12 by screws 19 or rivets. The discs have approximately radially extending recesses 20 defined in their outer faces. The recesses 20 serve for stiffening the side discs 18. The recesses 20 are so shaped that the discs 18 form stops 21, which serve to secure the metal-sheet reinforcements 17 if the latter are merely inserted in the grooves 16. On the radially inner edge of each side disc 18, there is an annular groove to receive a sealing ring 22. The ring 22 is pressed elastically against the end surface of the hub by the end discs.

The ring 22 permits the inside of the leaf-spring coupling to be filled with a lubricant, if desired.

As a precaution, to decrease possible loosening of the leaf-spring assemblies 13 from the hub 11, the shortest length, outside leaf springs 23 can be replaced with discs of relatively soft and therefore notchable material, comprised for instance of ordinary unhardened steel. Alternatively, in some other manner, the outer surfaces of the outer leaf springs 23 may be formed of an additional layer comprised of notchable material. At the same time, the end surfaces of the side walls of the intermediate pieces 14, 15, which are in contact with the outer leaf springs or discs of the assemblies are roughened. In this way, good adherence of the leaf-spring assemblies 13 to the hub 11 is assured.

For the same purpose, one can also proceed in the manner shown in FIG. 3. Here, the flatter surfaced, outermost leaf springs of a leaf-spring assembly 30 are replaced by wedge pieces 31. The wedge pieces become components of the leaf-spring assemblies. In this way, each assembly has an approximately dovetail-shaped foot, as seen in the axial direction. The shapes of the cooperating side surfaces of the intermediate pieces 34 and 35 are adapted to that of the foot of the adjacent assemblies, whereby the engaging surfaces are complementary.

Although the present invention has been described in connection with the preferred embodiments thereof, many variations and modifications will now become apparent to those skilled in the art. It is preferred, therefore, that the present invention be limited not by the specific disclosure herein, but only by the appended claims.

What is claimed is:

1. A torsionally elastic coupling comprising:
   an inner coupling part; an outer coupling part outside of and spaced from said inner coupling part;
   a plurality of leaf-spring assemblies extending between said inner and said outer coupling parts for elastically connecting those said coupling parts together; said leaf-spring assemblies having opposite sides which face generally toward the adjacent said leaf-spring assembly at each opposite side; each said leaf-spring assembly being comprised of a plurality of leaf-springs extending in the direction between said inner and said outer coupling parts, and said leaf-springs of each said assembly being placed adjacent to each other to define a body of substantially homogeneous flexural stress;
   at least one of said leaf-springs of each said assembly movably and continuouslly engaging said outer coupling part and such engagement being adapted to permit that said leaf-spring and the said assembly thereof to flex;
   wedge-shaped intermediate pieces positioned between adjacent said leaf-spring assemblies; each said intermediate piece having opposite tapered side walls which face toward and engage the opposite said side walls of the adjacent said leaf-spring assemblies between which said intermediate piece is positioned;
   said wedge-shaped intermediate pieces being held to said inner coupling part and said wedge-shaped intermediate pieces also serving as means for fastening said leaf-spring assemblies to said inner coupling part; a first plurality of said wedge-shaped intermediate pieces being separate elements from and being held to said inner coupling part; fastening means for fastening said first plurality of intermediate pieces to said inner coupling part; said fastening means driving said first plurality of intermediate pieces toward said inner coupling part for clamping said leaf spring assemblies between adjacent said intermediate pieces to hold said leaf-spring assemblies to said inner coupling part; a second plurality of said wedge-shaped intermediate pieces being interspersed around said inner coupling part among said first plurality of said intermediate pieces; said second plurality of intermediate pieces being integrally formed with said inner coupling part and projecting toward said outer coupling part from said inner coupling part.

2. The torsionally elastic coupling of claim 1, wherein said inner coupling part is a hub having a longitudinal axis and said outer coupling part is an outer ring around said hub and around said hub axis; each said leaf-spring assembly generally radially with respect to said axis from said hub to said outer ring.

3. The torsionally elastic coupling of either of claims 1 or 2, wherein said leaf-springs of a said assembly are of different lengths, and the longest of said leaf-springs of each said assembly being the at least one said leaf-spring that is movably engaging said outer coupling part.

4. The torsionally elastic coupling of claim 1, wherein each alternate said intermediate piece is of said first plurality and the next adjacent said intermediate piece is of said second plurality.

5. The torsionally elastic coupling of claim 1, wherein said intermediate pieces have engaging surfaces at their said side walls for engaging the adjacent said leaf-spring assemblies and said opposite sides of said assemblies are comprised of material adapted to engage with said engaging surfaces.

6. The torsionally elastic coupling of claim 5, wherein said engaging surfaces of said intermediate pieces are roughened and said opposite sides of said leaf-spring assemblies are comprised of notchable material.

7. The torsionally elastic coupling of claim 1, wherein in said leaf-spring assembly, at least one said leaf-spring assembly opposite side being defined by a respective wedge piece that is placed outside the last said spring of that said assembly on that said side of said assembly, and said wedge pieces being so shaped that the total thickness of said leaf-spring assembly increases along said wedge piece in the inward direction away from said outer coupling part; the adjacent said intermediate piece side walls being complementary to the shape of the said wedge piece for engaging the said wedge piece along its side.

8. The torsionally elastic coupling of claim 7, wherein there is a respective said wedge piece placed outside the last said spring of each said assembly at both said opposite sides of said assembly.

9. The torsionally elastic coupling of claim 2, wherein at least one said opposite side of each said leaf-spring assembly is defined by a respective wedge piece that is placed outside the last said leaf-spring of that said assembly, and said wedge piece being so shaped that the total thickness of said leaf-spring assembly increases along said wedge piece in the inner direction thereof away from said outer coupling part.

10. The torsionally elastic coupling of either of claims 1 or 2, wherein said outer coupling part has a plurality of grooves therein generally opening toward said inner coupling part and positioned such that said at least one leaf-spring of a respective said assembly is received in a respective said groove.

11. The torsionally elastic coupling of claim 10, wherein said outer coupling part is made of a light metal.

12. The torsionally elastic coupling of claim 11, further comprising a wear resistant reinforcement in each said groove, positioned for being engaged by said at least one leaf-spring during and after the flexing of said leaf-spring.

13. The torsionally elastic coupling of claim 10, further comprising a wear resistant reinforcement in each said groove, positioned for being engaged by said at least one leaf-spring during and after the flexing of said leaf-spring.

14. The torsionally elastic coupling of claim 13, wherein said leaf-springs of said assembly are of different lengths, and the longest of said leaf-springs of each said assembly being the at least one said leaf-spring that is movably engaging said outer coupling part.

15. The torsionally elastic coupling of claim 13, wherein each said reinforcement comprises a generally U-shaped piece, when said reinforcement is viewed in the direction transverse to the wedge shapes of said intermediate pieces.

16. The torsionally elastic coupling of claim 15, further comprising side discs on said coupling parts, on the sides thereof transverse to the wedge shapes of said intermediate pieces; said discs being shaped for defining stops for holding said reinforcements against shifting toward or away from said inner coupling part.

17. An elastic coupling comprising:
a first coupling part; a second coupling part near to and spaced from said first coupling part;
a plurality of leaf-spring assemblies extending between said coupling parts for elastically connecting them together; said leaf-spring assemblies having opposite sides which face generally toward the adjacent said leaf-spring assembly at each opposite side; each said leaf-spring assembly being comprised of a plurality of leaf-springs extending in the direction between said coupling parts, and said leaf-springs of each said assembly being placed adjacent to each other to define a body of substantially homogeneous flexural stress;
at least one of said leaf-springs of each said assembly movably and continuously engaging said second coupling part and such engagement being adapted to permit that said leaf-spring and the said assembly thereof to flex;
wedge-shaped intermediate pieces positioned between adjacent said leaf-spring assemblies; each said intermediate piece having opposite tapered side walls which face toward and engage the opposed said side walls of the adjacent said leaf-spring assemblies between which said intermediate piece is positioned;
said wedge-shaped intermediate pieces being held to said first coupling part and said wedge-shaped intermediate pieces also serving as means for fastening said leaf-spring assemblies to said first coupling part; a first plurality of said wedge-shaped intermediate pieces being separate elements from and being held to said first coupling part; fastening means for fastening said first plurality of intermediate pieces to said first coupling part; said fastening means driving said first plurality of intermediate pieces toward said first coupling part for clamping said leaf spring assemblies between adjacent said intermediate pieces to hold said leaf-spring assemblies to said first coupling part; a second plurality of said wedge-shaped intermediate pieces being interspersed around said first coupling part among said first plurality of said intermediate pieces; said second plurality of intermediate pieces being integrally formed with said first coupling part and projecting toward said second coupling part from said first coupling part.

18. The elastic coupling of claim 17, wherein each alternate said intermediate piece is of said first plurality and the next adjacent said intermediate pieces are of said second plurality.

* * * * *